United States Patent [19]
Ohlig

[11] Patent Number: 5,298,940
[45] Date of Patent: Mar. 29, 1994

[54] RAPID VACUUM HOLD DOWN SYSTEM AND METHOD

[76] Inventor: Albert H. Ohlig, 487 Esther St., Costa Mesa, Calif. 92627

[21] Appl. No.: 10,535

[22] Filed: Jan. 28, 1993

[51] Int. Cl.⁵ .................................... G03B 27/20
[52] U.S. Cl. ............................. 355/91; 355/99
[58] Field of Search .............. 355/87, 91, 93, 94, 355/99, 118

[56] References Cited

U.S. PATENT DOCUMENTS

| | | | |
|---|---|---|---|
| 3,922,087 | 11/1975 | Dillow | 355/87 |
| 4,054,383 | 10/1977 | Lin et al. | 355/91 |
| 4,360,266 | 11/1982 | Takeuchi | 355/91 |
| 4,423,851 | 1/1984 | Heitmann | 355/91 X |
| 4,484,813 | 11/1984 | Maher et al. | 355/93 |
| 4,551,016 | 11/1985 | Maher et al. | 355/91 |
| 4,666,871 | 6/1987 | Wetzel et al. | 355/91 |
| 4,669,870 | 6/1987 | Fosh | 355/91 |
| 4,676,633 | 6/1987 | Burgess et al. | 355/91 |
| 4,705,392 | 11/1987 | Ohlig | 355/91 |
| 4,707,125 | 11/1987 | Ohlig et al. | 355/94 |
| 4,711,570 | 12/1987 | Nelen | 355/91 |
| 4,754,309 | 6/1988 | Lesko | 355/91 |
| 4,812,883 | 3/1989 | Ohlig | 355/91 |
| 4,888,488 | 12/1989 | Miyake | 355/91 X |
| 4,916,484 | 4/1990 | Ohlig | 355/91 |
| 4,935,773 | 6/1990 | Meacham | 355/92 |
| 4,984,017 | 1/1991 | Nishida et al. | 355/91 |
| 5,144,365 | 9/1992 | Visage | 355/91 |
| 5,206,680 | 4/1993 | Dillow | 355/91 |

*Primary Examiner*—Richard A. Wintercorn
*Attorney, Agent, or Firm*—Albert C. Smith

[57] ABSTRACT

The method and apparatus for securing a sheet of photographic material in position on a plate during exposure to a source of radiation includes configuring a flexible vacuum blanket substantially to the shape of a rigid template that forms surface recesses in a selected pattern to facilitate the evacuation of air from beneath the vacuum blanket, and then reconfiguring the surface of the vacuum blanket to smooth condition by relieving vacuum between the blanket and the template to promote substantially continuous contact with the sheet and plate. The sheet may be exposed to a source of radiation through the plate or, after removing the template, through the vacuum blanket which may be formed of transparent polymer material.

7 Claims, 4 Drawing Sheets

RAPID VACUUM HOLD DOWN SYSTEM AND METHOD

FIELD OF THE INVENTION

This invention relates to a system and method for firmly supporting photographic materials in accurate registration during contact exposure, and more particularly to a hold down system and method which dynamically configures the surface properties of a vacuum hold down blanket as air is evacuated from the region covered by the blanket.

BACKGROUND OF THE INVENTION

Contact exposure of photographic copy and master sheets requires accurate registration and fixation against relative motion during exposure. Conventional registration schemes rely upon an air-impervious, flexible membrane, or vacuum blanket, to overlay registered master and copy sheets that are disposed on a supporting plate during exposure. For large surface areas, such vacuum blankets capture significant volumes of air that must be evacuated prior to exposure from between the sheets and from between the support plate and sheets to assure uniform, flat, intimate contact registration without interposed air bubbles that might distort the reproduced image.

Conventional techniques for evacuating air from beneath a vacuum blanket include mechanisms which roll out a flexible vacuum blanket over contiguous sheets, starting at one edge and progressing across the sheets to the other edge in order to squeeze out entrapped air as the vacuum blanket is progressively laid down over the sheets. Other techniques include laying down a flexible blanket over photographic sheets in progressive stages under vacuum control within specific segments of the total area covered by the blanket. In addition, techniques are known for altering the surface properties of a flexible vacuum blanket as air is evacuated from beneath the blanket to promote removal of all air entrapped beneath the blanket and between photographic sheets under the blanket. These techniques are described in the literature (see, for example, U.S. Pat. Nos. 4,707,125, 4,812,883, and 4,669,870).

SUMMARY OF THE INVENTION

In accordance with the present invention, a rigid template having a desired surface pattern of recessed channels overlays a flexible vacuum blanket to form a vacuum chamber between the template and blanket in order to configure the surface of the vacuum blanket under vacuum control as air is evacuated from the region beneath the vacuum blanket. This promotes vacuum-controlled formation of desirable surface-oriented channels in the surface of the vacuum blanket to facilitate removal of air from all regions of the area covered by the blanket, and then promotes reconfiguration of the vacuum blanket to restore a smooth surface against the photographic sheets by reducing the vacuum between template and vacuum blanket. In this manner, the vacuum blanket may be formed of light weight, flexible, air-impervious material that can be sufficiently thin and transparent, to serve as a support plate for the photographic sheets through which illumination may be supplied to the photographic sheets.

DESCRIPTION OF THE PREFERRED EMBODIMENT

Figure 1:
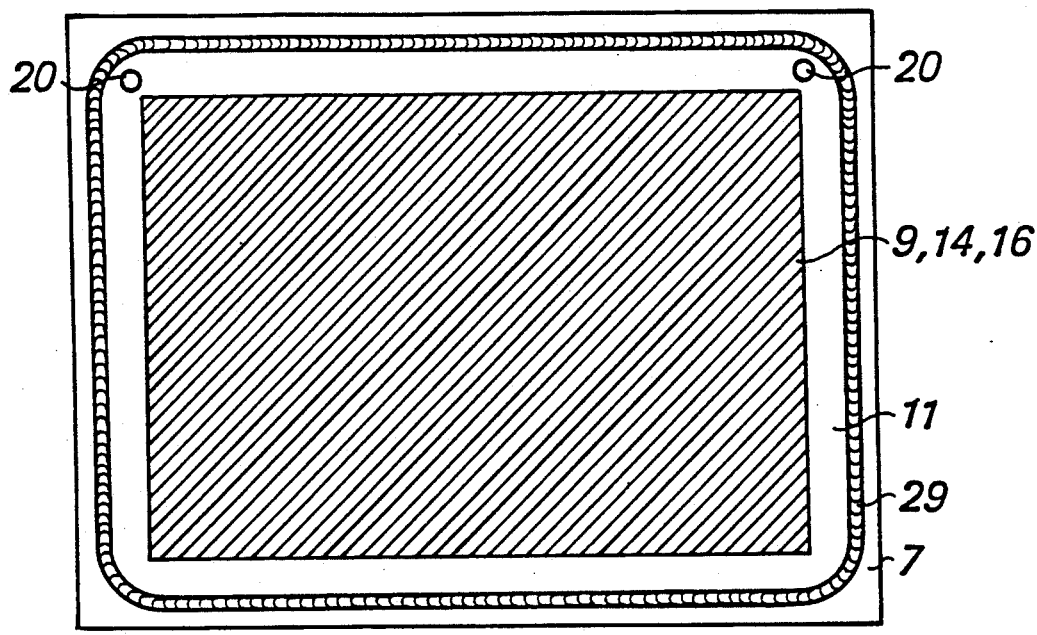
FIG. 1 is a pictorial view of a photographic exposure system according to one embodiment of the present invention.
Figure 2:
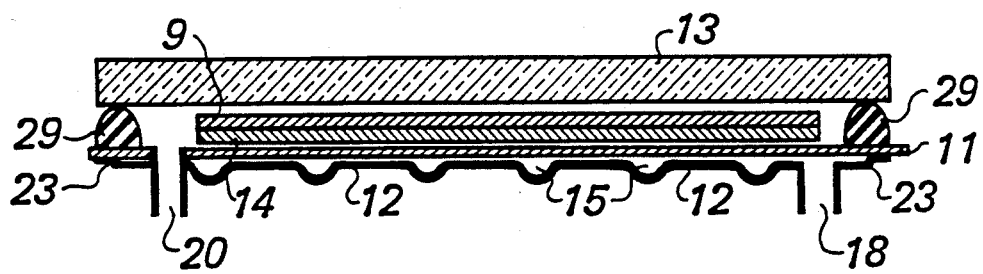
FIG. 2 is a sectional view of one embodiment of the system of FIG. 1.

Referring now to FIG. 1, there is shown a plan view of a frame of an exposure system which is arranged to hold master and copy sheets of photographic materials in contact registration during exposure to a source of illumination. A base plate 7 supports one or more sheets of photographic material 9, 14, 16 on registration pins (not shown), and a flexible, air-impervious blanket 11. A glass plate (not shown) may overlay the layers of photographic sheets and blanket and base plate to form a first region that can be evacuated between vacuum blanket 11 and glass plate in order to hold the photographic sheets 9, 14, 16 in contact registration during exposure through the glass plate to a source of illumination that is disposed above the glass plate. Of course, the layers of glass plate, photographic sheets and vacuum blanket may be inverted for exposing the photographic sheets to a source of illumination that is disposed below the glass plate. In accordance with the embodiment of the present invention, as illustrated in the sectional views of FIGS. 2 and 3, the base plate 7 may comprise a substantially rigid template 12 having substantial surface recesses or channels 15 in the face thereof adjacent to the vacuum blanket 11 for establishing a second region from which air is evacuated in order to urge the back surface of the flexible blanket 11 into the channels 15 to establish a front surface adjacent the photographic sheets that also includes channels 17. Vacuum seals 23, 29 are formed between the vacuum blanket 11 and template 12, and between the vacuum blanket 11 and plate 13. With the surface of the vacuum blanket 11 thus configured, the first region between the vacuum blanket 11 and the glass plate 13 is then evacuated to urge the photographic sheets 9, 14 into contact registration between the blanket 11 and the glass plate 13. More importantly, however, the embossed pattern of channels in the surface of the vacuum blanket 11 thus provides channels or passages 17, 19, 21, as illustrated in the sectional view of FIG. 4, through which residual volumes of air in the inner portions of the region between the vacuum blanket 11 and the glass plate 13 and the photographic sheets 9, 14 may be more completely evacuated. Then, as evacuation of air from this first region continues, the vacuum in the second region between the vacuum blanket 11 and the template 12 may be relieved to allow the surface of the flexible vacuum blanket 11 to return to substantially smooth, flat condition adjacent the photographic sheets 9, 14, 16. Thus, the vacuum blanket 11 attains a smooth, flat surface for urging the photographic sheets 9, 14, 16 against the smooth, flat glass plate 13 during final evacuation of air from the first region to assure smooth, flat contact registration of the photographic sheets 9, 14, 16 devoid of entrapped air that may ripple or otherwise distort the sheets 9, 14, 16 during exposure thereof through the glass plate 13 to a source of illumination. Air is evacuated from the second region between blanket 11 and template 12 via one or more vacuum ports 18 in order to configure the surface of the blanket 11, and air is evacuated from the first region between the blanket 11 and plate 13 via one or more vacuum ports 20 to secure the position of sheets 9, 14 against the plate 13.

Figure 3:
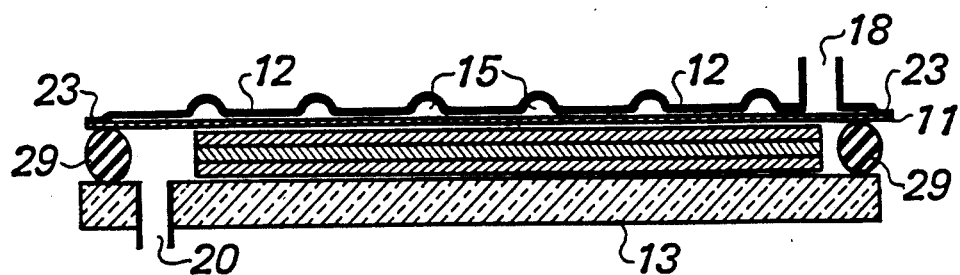
FIG. 3 is a sectional view of another embodiment of the system of FIG. 1.
Figure 4:
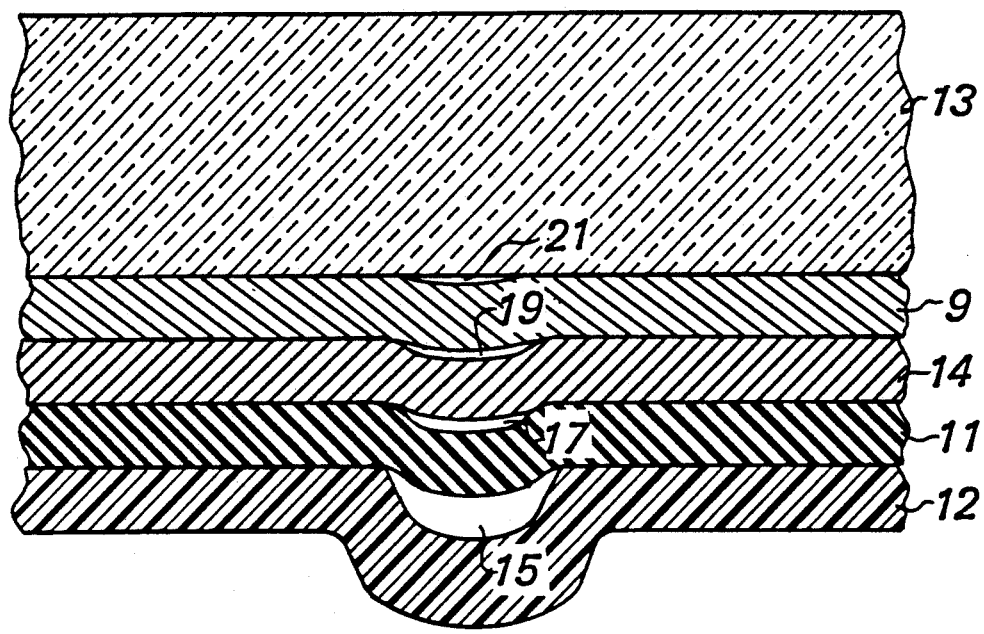
FIG. 4 is a sectional view of the layers of material involved in the sectional view of FIG. 3.
Figure 5:
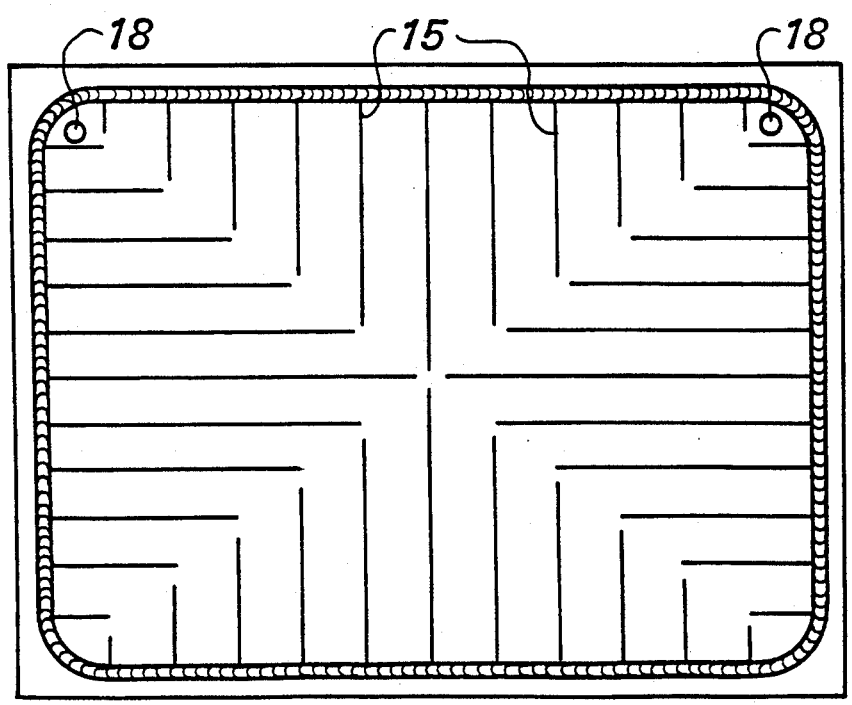
FIGS. 5-9 are pictorial views of the system of FIG. 1 illustrating various template patterns suitable for facilitating evacuating air from beneath the vacuum blanket.
Figure 6:
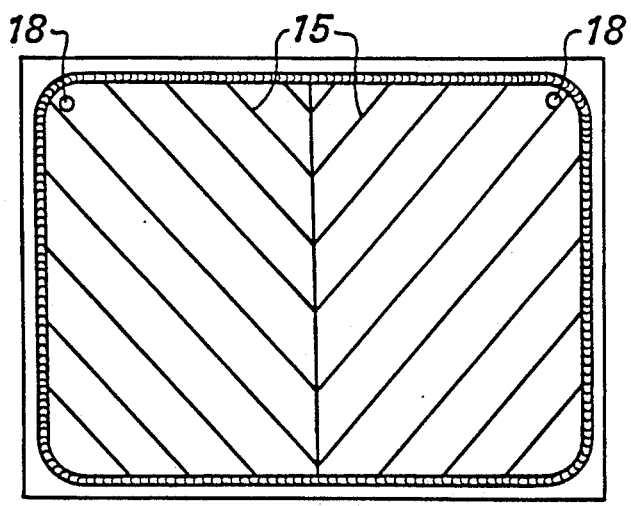
Figure 7:
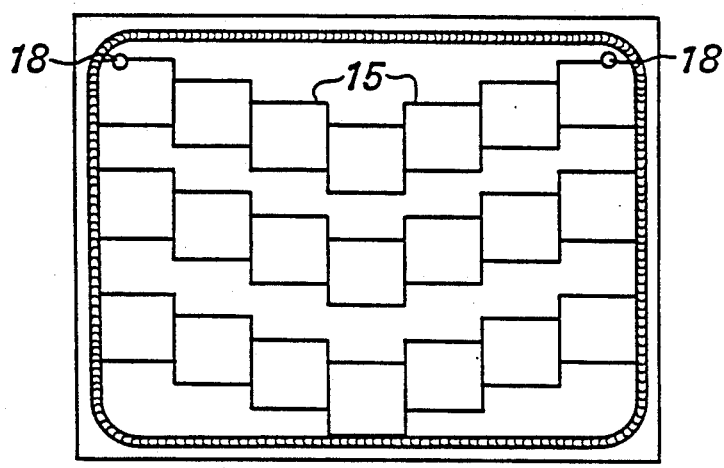
Figure 8:
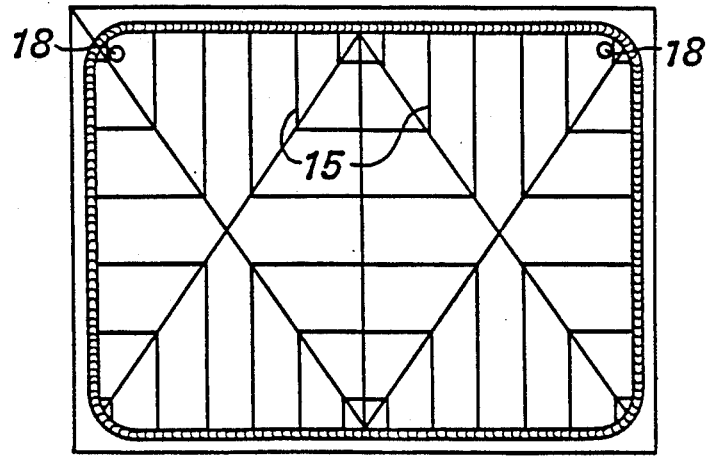
Figure 9:
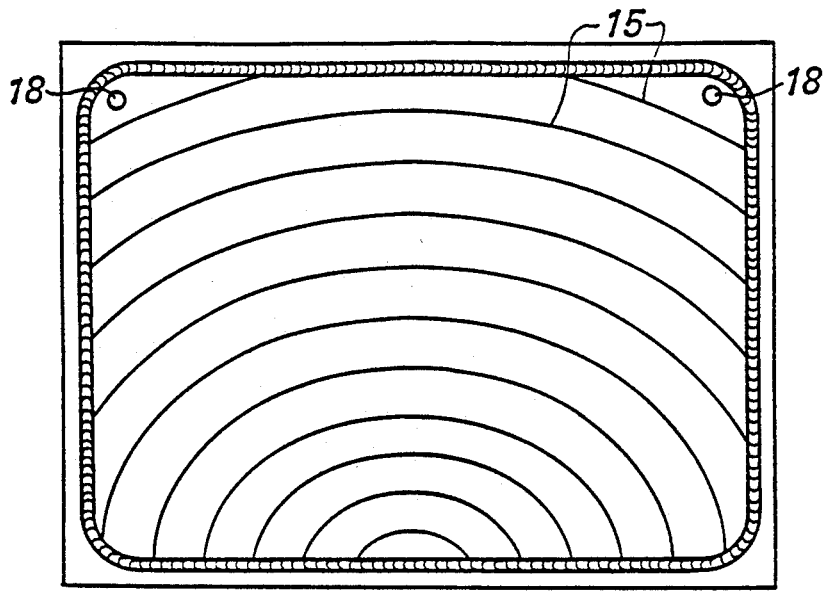

Referring now to the illustrated embodiment of FIG. 3, there is shown an inverted layering of photographic sheets 9, 14, 16 and vacuum blanket 11 and template 12 disposed on top of a base plate 13 which may be a glass plate for exposure to a source of illumination located beneath the glass plate. In addition, according to the present invention, the vacuum blanket 11 may also be transparent for holding the photographic sheets 9, 14, 16 in contact registration against the plate 13 for exposure to a source of illumination through the vacuum blanket 11. In this embodiment of the present invention, the template 12 may be retained in place on the upper surface of the blanket 11 during application of vacuum to the second region via vacuum port 18 for embossing the surface of the vacuum blanket, and may then be removed from the surface of the blanket following relieving of the vacuum applied to the second region via the vacuum port 18. Thus, the base plate 13 may be smooth and flat, but not necessarily transparent, for exposing the photographic sheets 9, 14, 16 to a source of illumination through the transparent vacuum blanket 11, or may be smooth and flat and transparent for exposing the photographic sheets to a source of illumination from the side of the plate 13, or from the side of the blanket 11, or from both sides. The transparent vacuum blanket 11 may be formed of a transparent polymer such as acrylic or polycarbonate material.

Referring now to FIGS. 5-9, there are shown various patterns of recesses or channels 15 within the surface of the template 12 that are arranged toward vacuum ports 18 for embossing or otherwise configuring the surface of the vacuum blanket 11 in contact with the photographic sheets 9, 14, 16 in the same pattern to promote more complete evacuation of air from beneath the blanket 11. Of course, other patterns of channels may also be used that configure the surface of the vacuum blanket 11 in a manner that tends to promote more complete evacuation of air beneath the vacuum blanket without leaving air pockets that might distort the photographic sheets from smooth, flat contact registration during exposure to a source of illumination.

Figure 10:
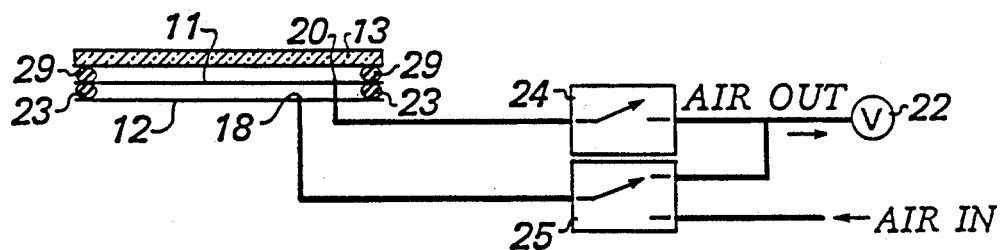
FIGS. 10-12 are schematic diagrams of the vacuum system for controlling the dynamic configuration of the vacuum blanket in progressive stages during evacuation of air from beneath the blanket.
Figure 11:
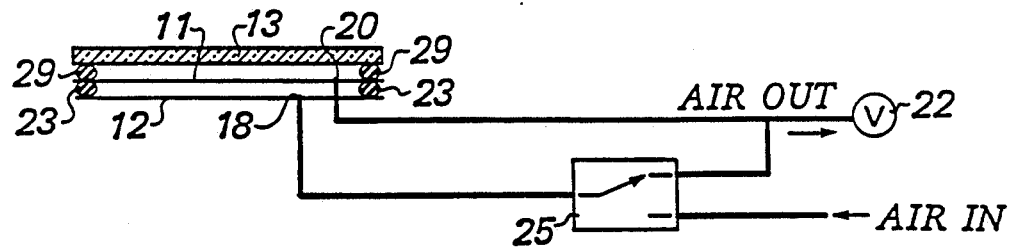
Figure 12:
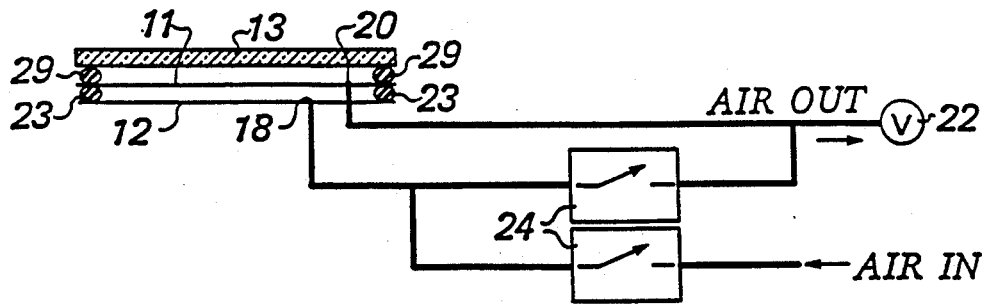

Referring now to FIGS. 10-12, there are shown various schematic diagrams of the vacuum conduits and valves useful for evacuating air from the template chamber, or second region, to dynamically configure the surface of the blanket 11, as well as for evacuating air from the main chamber, or first region, to retain the photographic sheets in contact registration during exposure to a source of illumination. In each arrangement, it should be noted that the vacuum source 22 and valves 24, 25 and conduits 18, 20 are arranged and operated to assure that vacuum is first applied to the second region between the template 12 and the vacuum blanket 11 in order to configure the surface of the vacuum blanket 11 to include recesses or channels that promote evacuation of air as vacuum is also applied to the first region between the vacuum blanket 11 and the plate 13 containing the photographic sheets 9. In addition, the vacuum valves and conduits are arranged and operated to relieve the vacuum in the second region during the evacuation of air in the first region to dynamically reconfigure the surface of the vacuum blanket 11 to a smooth, flat surface in contact with the photographic sheets as the first region continues to be evacuated. In this way, the vacuum blanket 11 may be maximally utilized in multiple configurations during the processing of photographic sheets to promote more complete evacuation of air from the first region, and to apply an effectively smooth, flat hold down force uniformly to the photographic sheets, and also to serve as the platen through which exposure of the photographic sheets to a source of illumination may take place. After exposure, the vacuum may be relieved in the first region by actuating the valve 24 to admit air at ambient pressure, or by disabling the vacuum pump 22 to admit air at ambient pressure through the diabled pump 22.

What is claimed is:

1. Vacuum blanket apparatus for securing the position of a sheet, the apparatus comprising:

a plate disposed to reference the placement of a sheet;

a flexible, substantially gas-impervious membrane disposed to overlay a sheet in position relative to the plate for forming a seal therewith to provide a first region for containing the sheet adjacent one surface of the membrane;

a substantially rigid template having recesses therein oriented in a selected pattern and overlaying the membrane in vacuum-sealing relationship therewith to provide a second region adjacent a surface of the membrane opposite said one surface of the membrane; and vacuum means including a first conduit communicating with the first region and a second conduit communicating with the second region for initially urging said opposite surface of the membrane into the recesses of the template in response to vacuum applied to the second region via the second conduit to configure the one surface of the membrane to include recesses therein substantially in the selected pattern of the recesses in the template, the vacuum means also evacuating air from the first region via the first conduit to urge the patterned one surface of the membrane and a sheet in contact therewith into contact with the plate, and the vacuum means subsequently admitting air to the second region to release said opposite surface from the recesses in the template thereby to reconfigure the one surface of the membrane without the selected pattern of recesses for urging the substantially smooth one surface of the membrane and a sheet contained in the first region into contact with the plate.

2. Apparatus as in claim 1 wherein the sheet includes photographic material and said plate is transparent for passing radiation therethrough to the photographic material of the sheet.

3. Apparatus as in claim 1 wherein the sheet includes photographic material and said membrane is transparent for passing radiation therethrough to the photographic material of the sheet.

4. A method of securing a sheet of material in position on a plate using a flexible, gas-impervious membrane and a template having surface recesses in a selected pattern, the method comprising the steps of:
- forming a first pressure chamber between the plate and one surface of the membrane for containing therein a sheet of material to be secured in position against the plate;
- forming a second pressure chamber between the and a surface of the membrane opposite the one surface thereof;
- evacuating the second pressure chamber to urge said opposite surface of the membrane into the pattern of recesses in the template to configure the one surface of the membrane to include recesses therein substantially in said selected pattern;
- evacuating the first pressure chamber to urge the patterned one surface of the membrane and a sheet of material contained within the first pressure chamber into contact with the plate; and
- subsequently increasing pressure in the second pressure chamber to reconfigure said one surface of the membrane to substantially smooth surfaces without recesses therein for establishing substantially continuous surface contact between said one surface and a sheet of material contained in the first chamber with the plate.

5. The method according to claim 4 for exposing a sheet of photographic material comprising the additional step of:
- exposing the sheet to a source of radiation through the plate after said one surface of the membrane is reconfigured to substantially smooth surfaces without recesses therein.

6. The method according to claim 4 for exposing a sheet of photographic material comprising the additional step of:
- exposing the sheet to a source of radiation through the membrane after said one surface of the membrane is reconfigured to substantially smooth surfaces without recesses therein.

7. The method according to claim 4 comprising the additional step of:
- removing the template from said opposite surface of the membrane after increasing pressure in the second pressure chamber.

* * * * *